United States Patent
Blais

(10) Patent No.: US 10,851,688 B2
(45) Date of Patent: Dec. 1, 2020

(54) OIL LEAKAGE RECOVERY SYSTEM FOR GAS TURBINE ENGINE

(71) Applicant: PRATT & WHITNEY CANADA CORP., Longueuil (CA)

(72) Inventor: Daniel Blais, St-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 385 days.

(21) Appl. No.: 15/131,736

(22) Filed: Apr. 18, 2016

(65) Prior Publication Data

US 2017/0298792 A1    Oct. 19, 2017

(51) Int. Cl.
*F01M 11/00* (2006.01)
*F01M 11/04* (2006.01)
*F02C 7/06* (2006.01)

(52) U.S. Cl.
CPC ..... *F01M 11/0004* (2013.01); *F01M 11/0408* (2013.01); *F02C 7/06* (2013.01); *F01M 2011/0029* (2013.01); *F01M 2011/0416* (2013.01)

(58) Field of Classification Search
CPC ....... F01M 11/0004; F01M 2011/0029; F01M 11/0408; F01M 2011/0416; F02C 7/06; F01D 25/18; F01D 25/20
USPC .......................................... 60/39.08
See application file for complete search history.

(56) References Cited

U.S. PATENT DOCUMENTS

| | | | | |
|---|---|---|---|---|
| 2,391,000 A | * | 12/1945 | Allen | F01D 25/18 184/104.1 |
| 3,472,024 A | * | 10/1969 | Strub | F01D 25/34 60/39.08 |
| 4,722,663 A | | 2/1988 | Swearingen | |
| 4,872,976 A | * | 10/1989 | Cudaback | B01D 27/106 210/130 |
| 5,031,509 A | | 7/1991 | Cowan | |
| 5,046,306 A | * | 9/1991 | Borre, Jr. | F01D 25/18 184/6.11 |
| 6,463,819 B1 | * | 10/2002 | Rago | B64D 37/22 137/112 |

(Continued)

FOREIGN PATENT DOCUMENTS

CN    1693685 A    11/2005

*Primary Examiner* — Jesse S Bogue
*Assistant Examiner* — Loren C Edwards
(74) *Attorney, Agent, or Firm* — Norton Rose Fulbright Canada LLP

(57) ABSTRACT

An oil leakage recovery system for recovering leaked oil in an oil system of a gas turbine engine The oil leakage recovery system includes a collecting reservoir having an inlet opening and an outlet opening each communicating with the oil system, a piston operatively mounted with the collecting reservoir and movable between a first position in which the piston is disposed away from the outlet opening to allow oil to leak from the collecting reservoir to the oil system and a second position in which the piston blocks the outlet opening to impede oil leaking from the collecting reservoir from the collecting reservoir to the oil system, and a pressure-controlled actuator system configured to move the piston to the first position when a pressure of the oil system is below a threshold pressure value and to the second position when the pressure of the oil system is above the threshold pressure value.

16 Claims, 4 Drawing Sheets

(56) References Cited

U.S. PATENT DOCUMENTS 7,941,996 B2  5/2011  Bovina et al.

* cited by examiner

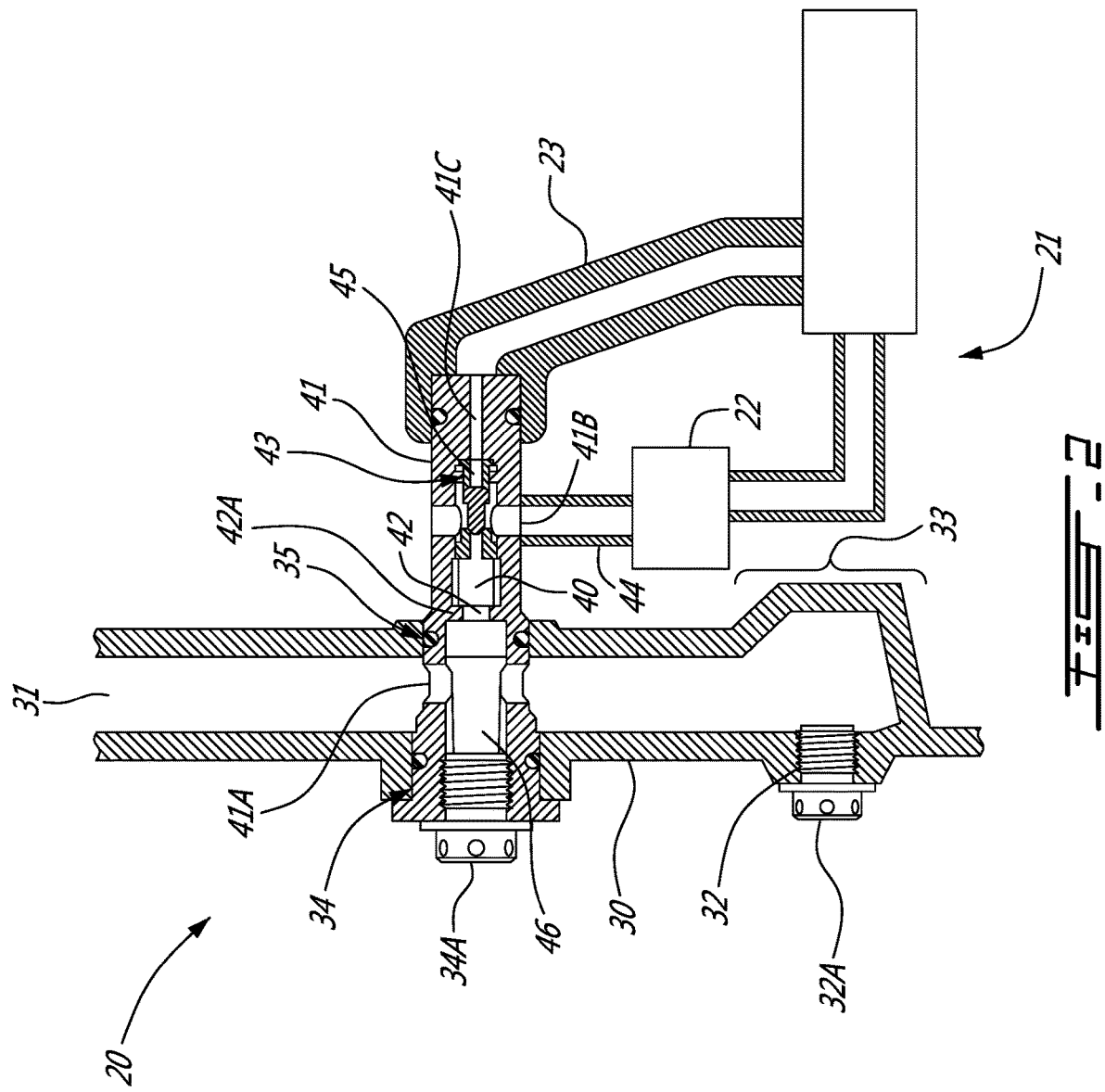

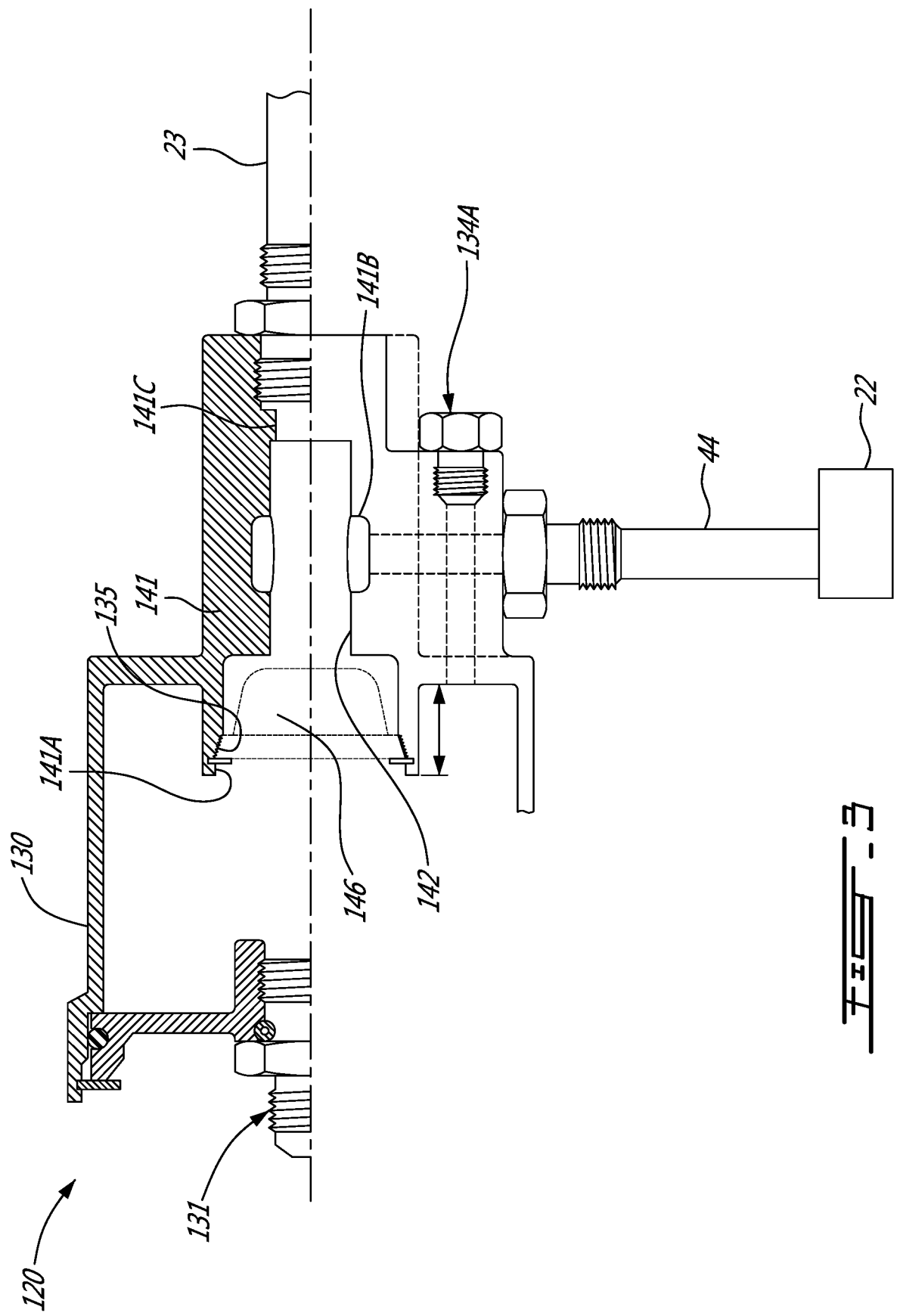

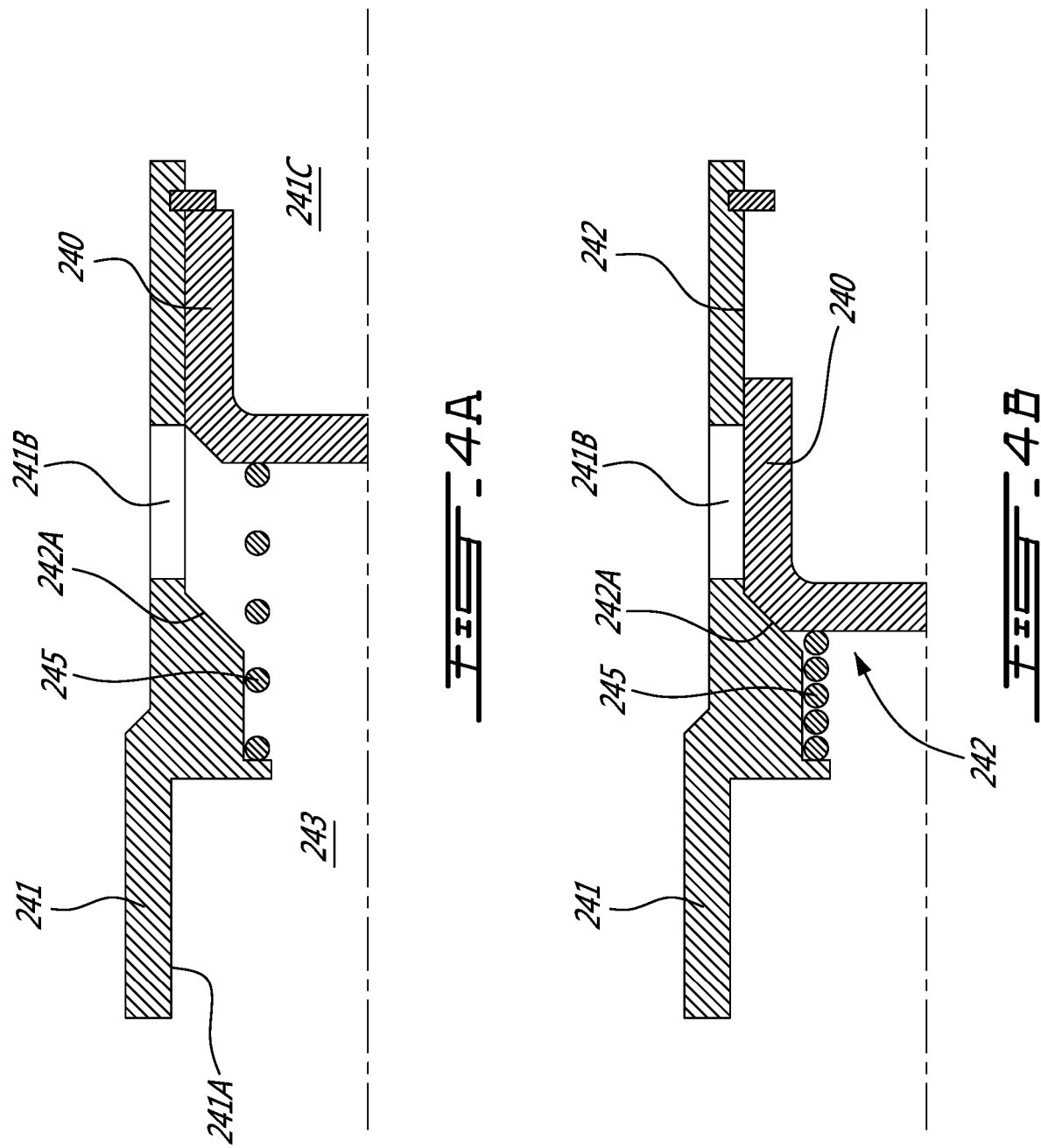

OIL LEAKAGE RECOVERY SYSTEM FOR GAS TURBINE ENGINE

TECHNICAL FIELD

The application relates generally to oil systems used in gas turbine engines and, more particularly, to an oil leakage recovery system.

BACKGROUND OF THE ART

Gas turbine engines employ high-speed rotating parts such as bearings. These parts may require a supply of oil for lubrication and cooling. Oil systems are used to provide oil to these parts. Oil seals are commonly used to retain oil within cavities and/or to prevent oil leakage. However, oil may still leak and accumulate in different areas of the engine. Typically, leaked oil is drained into cavities or tanks to be removed or scavenged by the operator. Leaked oil can also drain over external parts of the engine.

SUMMARY

In one aspect, there is provided an oil leakage recovery system for recovering leaked oil in an oil system of a gas turbine engine, the oil leakage recovery system comprising a collecting reservoir having an inlet opening and an outlet opening each communicating with the oil system; a piston operatively mounted with the collecting reservoir and movable between a first position in which the piston is disposed away from the outlet opening to allow oil to leak from the collecting reservoir to the oil system and a second position in which the piston blocks the outlet opening to impede oil leaking from the collecting reservoir from the collecting reservoir to the oil system; and a pressure-controlled actuator system configured to move the piston to the first position when a pressure of the oil system is below a threshold pressure value and to the second position when the pressure of the oil system is above the threshold pressure value.

In another aspect, there is provided a gas turbine engine comprising at least one internal combustion engine; an oil system including an oil reservoir fluidly connected to the internal combustion engine for lubricating the internal combustion engine; and an oil leakage recovery system fluidly connected to the oil system for recovering leaked oil in the oil system, the oil leakage recovery system including a collecting reservoir having an inlet opening and an outlet opening, each communicating with the oil system; a piston operatively mounted with the collecting reservoir and moveable to a first position in which the piston is disposed away from the outlet opening to allow oil to leak from the collecting reservoir to the oil system and a second position in which the piston blocks the outlet opening to impede oil leaking from the collecting reservoir to the oil system; and a pressure-controlled actuator system configured to move the piston to the first position when a pressure of the oil system is below a threshold pressure value and to the second position when the pressure of the oil system is above the threshold pressure value.

In a further aspect, there is provided a method for recovering leaked oil in an oil system of a gas turbine engine, the method comprising receiving and collecting the leaked oil into a collecting reservoir; opening an oil passage between the collecting reservoir and the oil system to allow oil collected in the collecting reservoir to leak in the oil system when a threshold pressure value of the oil system is not reached; and blocking the oil passage to impede oil leaking from the collecting reservoir to the oil system when the threshold pressure value is reached.

DESCRIPTION OF THE DRAWINGS

Reference is now made to the accompanying figures in which:

FIG. 2 is a schematic cross-sectional view of an oil leakage recovery system in accordance with an embodiment of the present disclosure.

FIG. 3 is a schematic cross-sectional view of the oil leakage recovery system in accordance with an embodiment of the present disclosure.

FIGS. 4A and 4B are schematic cross-sectional views of a section of the oil leakage recovery system in accordance with an embodiment of the present disclosure.

DETAILED DESCRIPTION

Figure 1:
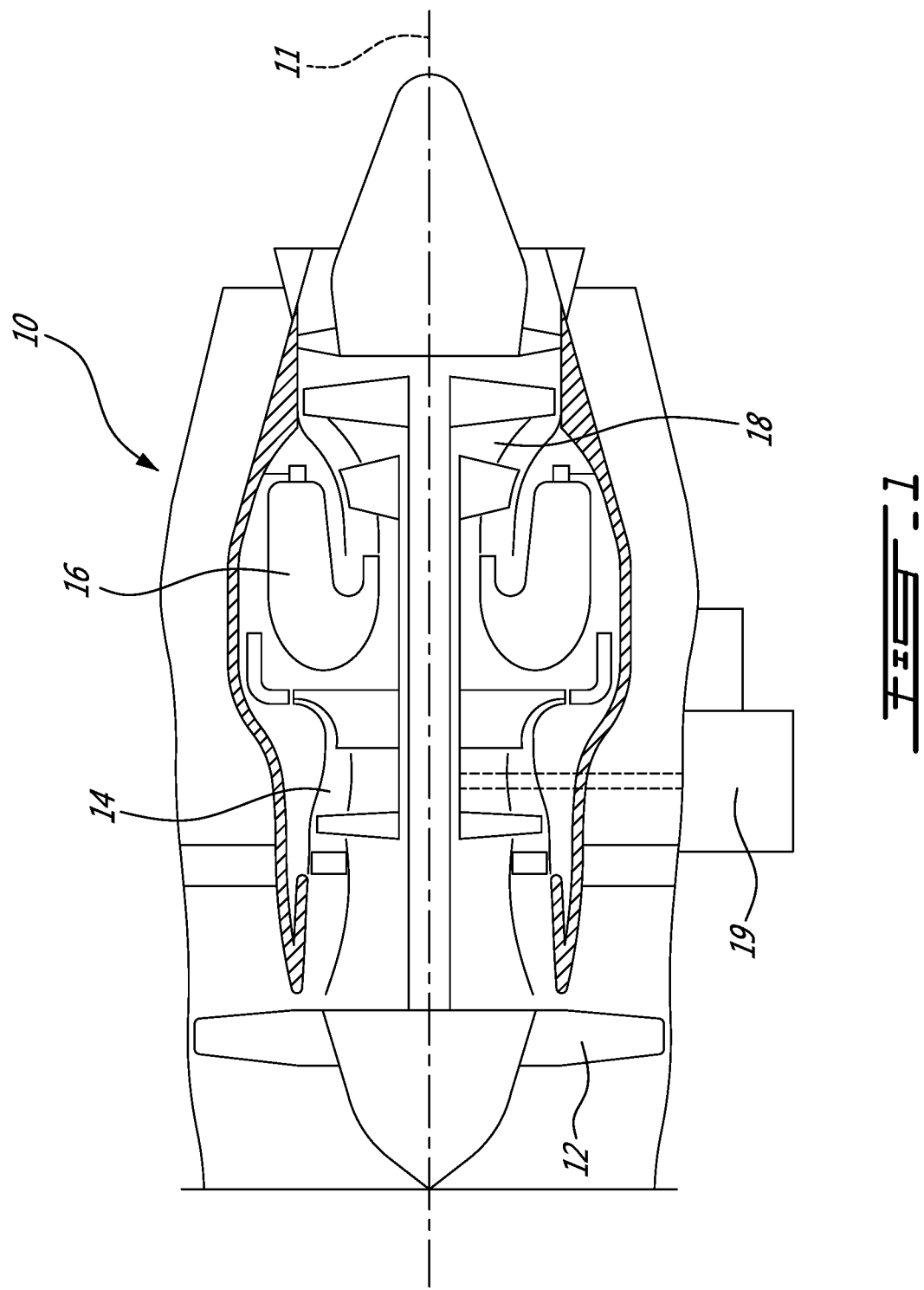
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. An accessory gearbox 19 may be driven by either one of the compressor 14 and the turbine section 18.

The gas turbine engine 10 also includes bearings and/or other accessories including oil seals (not shown). Fluids, such as oil for example, are commonly provided to lubricate and cool such bearings and accessories. Face seals can be used to seal the bearings, for instance of the type used in the accessory gearbox 19 of the gas turbine engine 10. These components normally operate at high pressures and may cause oil leakage through the face seals, or any other seal type.

Referring to FIG. 2, an oil leakage recovery system in accordance with the present disclosure is generally shown at 20. The oil leakage recovery system 20 is provided to recover, collect and/or retain the leaked oil and to return all or part of the collected oil back into an oil system 21 of the engine 10. The oil system 21 can be used to manage the oil flow of the engine 10 and provide oil for lubricating, cooling and/or activating certain accessories of the engine 10, among other things.

In the embodiment shown, the oil system 21 includes an oil reservoir 22 for retaining at least part of the oil used in the oil system 21. The oil reservoir 22 can include for example a cavity of the accessory gearbox (AGB) 19 (FIG. 1), a cavity of a reduction gearbox (RGB) or any other oil wetted cavity of the engine 10.

The oil system 21 also includes a conduit 23 connected to the oil leakage recovery system 20 for providing a pressurized fluid. The pressurized fluid can include a liquid, such as oil, or a gas, such as air. For instance, the pressurized fluid is pressurized oil from the oil system 21. In the embodiment shown, the conduit 23 is a tube fluidly connecting the oil leakage recovery system 20 with the oil system 21. In an alternate embodiment, the conduit can be any signal transmitter, such as an electric wire, capable of transmitting a signal indicative of a threshold pressure value being reached in the oil system 21.

The oil leakage recovery system 20 includes a collecting reservoir 30 for receiving and/or retaining the leaked oil. The collecting reservoir 30 also serves to collect any solid debris in the leaked oil. The collecting reservoir 30 can be any suitable cavity sized and shaped to retain oil therein. For example, a larger collecting reservoir can be used in engines having a larger volume of circulating oil. The collecting reservoir 30 includes an inlet opening 31 to receive the leaked oil therein, for instance, from the face seals of the oil system. The inlet opening 31 may be in fluid communication with a network of oil collecting channels, directing by gravity or pressure differential leaked oil to the collecting reservoir 30 via the inlet opening 31. In the particular embodiment shown, the collecting reservoir 30 is a cast cavity. Alternatively, other manufacturing techniques can be used to form the collecting reservoir 30, such as machining. In a particular embodiment, the collecting reservoir 30 may include multiple reservoirs. In such an embodiment, these multiple reservoirs can be fluidly interconnected to allow the leaked oil to flow from one reservoir to another.

The collecting reservoir 30 may also include a drain opening 32 plugged by a removable drain cover 32A and located in a lower part 33 of the collecting reservoir 30 for draining the collecting reservoir 30. In the embodiment shown, the drain opening 32 is located in a lateral surface of the collecting reservoir 30. Advantageously, when the engine 10 is horizontally placed and oriented relative to the ground, for example when an aircraft including the engine 10 is parked on the ground, the leaked oil and any solid debris therewith inside the collecting reservoir 30 accumulate in the lower part 33 of the collecting reservoir 30 by gravitational forces. The location of the drain opening 32 in the lower part 33 of the collecting reservoir 30 can be useful for draining the collecting reservoir 30. Other configurations and locations of the drain opening 32 are possible.

In the embodiment shown, the collecting reservoir 30 includes two opposite openings, an access opening 34 plugged by a removable access cover 34A and an outlet opening 35, aligned with the access opening 34, through which oil can leak to the oil system 21. The access opening 34 provides direct access to the collecting reservoir 30 and is selectively located to allow a user to access the collecting reservoir 30 without disassembling or removing the collecting reservoir 30 from the engine 10. This direct access to the collecting reservoir 30 can be advantageous for maintenance or servicing operations. The outlet opening 35 is used to fluidly connect the collecting reservoir 30 to the oil system 21. Alternatively, the outlet opening 35 can be used to fluidly connect the collecting reservoir 30 to other components or systems.

The oil leakage recovery system 20 also includes a piston 40. The piston 40 can be any movable body, such as part of an actuator, for selectively opening and/or closing fluid paths of the leaked oil between the collecting reservoir 30, the oil reservoir 22 and the conduit 23. In the particular embodiment shown, the piston 40 is housed within a housing 41 mounted to the collecting reservoir 30, in a cylinder or valve like assembly. The housing 41 may be an elongated tubular structure that extends through a width of the collecting reservoir 30 and is disposed within the access opening 34 and the outlet opening 35. The housing 41 has an annular housing inlet 41A fluidly communicating with the collecting reservoir 30, a housing outlet 41B fluidly communicating with the oil reservoir 22, and a housing channel 41C fluidly communicating with the conduit 23. The housing 41 defines a flow path therein communicating with the housing inlet 41A and the housing outlet 41B to allow the leaked oil to flow from the collecting reservoir 30 to the oil system 21. The housing 41 also defines a flow opening 42 across the flow path located between the housing inlet 41A and the housing outlet 41B. Other configurations of the housing structure are possible.

In an alternative embodiment, the housing 41 can be omitted and references to the flow opening 42 in the description will refer to the outlet opening 35. In such embodiments, the piston 40 can be mounted by other means to the collecting reservoir 30.

The piston 40 can be displaced along the flow path to block the flow opening 42 and/or the outlet opening 35. "Blocking" the flow opening 42 includes the piston 40 abutting a structure forming a seat 42A around the flow opening 42 to impede and/or to oil leaking from the collecting reservoir 30 to the oil system 21. When the piston 40 is disengaged from the flow opening 42 and/or the outlet opening 35, leaked oil flows around the piston 40 through the flow path. The piston 40 can include any device or member capable of closing the flow opening 42, such as a valve, a cylinder, a biasing device. For example, a three-port shuttle valve may be used, as in FIG. 2.

A pressure-controlled actuator system 43 (herein, the piston 40 connected to an actuation device by a stem) is provided within the housing 41 to displace the piston 40 between a first position, when a pressure of the oil system 21 is below a given threshold pressure value, and an second position, when the pressure of the oil system 21 is above the given threshold pressure value. The threshold pressure value is selectively determined to cause the displacement of the piston 40 towards the second position when the engine 10 is in an operative mode. Advantageously, blocking the flow of the leaked oil when the engine 10 is in the operative mode prevents a flow of oil from the oil reservoir 22 to the collecting reservoir 30. During engine operation, a pressure build-up of the oil inside the oil system 21 may result in the pressure inside the oil reservoir 22 being higher than the pressure inside the collecting reservoir 30, which may result in oil flow from the oil reservoir 22 to the collecting reservoir 30 if the flow opening 42 remains open. In the embodiment shown, the actuator system 43 is a hydraulic actuator activated by the pressurized fluid inside the conduit 23 through the housing channel 41C.

In the second position, the piston 40 is displaced towards the flow opening 42 via the actuator system 43 to block or impede the flow of the leaked oil from the collecting reservoir 30 to the oil reservoir 22. The pressurized fluid of the oil system 21 is utilized to displace the actuator system 43 away from the housing channel 41C thereby displacing the piston 40 towards the flow opening 42. Other actuating devices can be used such as pneumatic devices, electric devices and the like.

In the first position, the piston 40 is displaced via the actuator system 43 away from the flow opening 42 to allow the flow of the leaked oil from the collecting reservoir 30 to the oil reservoir 22. A pipe 44 connects the housing 41 with the oil reservoir 22. The actuator system 43 includes a bias member 45 to urge the piston 40 away from the flow opening 42 thereby disengaging the flow opening 42 and displacing the piston 40 towards the first position. This is the idle or default position of the piston 40. The bias member 45 can be a spring or any other device to displace the piston 40. The bias member 45 is selectively adjusted to cooperate with the threshold pressure value. For example, if the threshold pressure value is X psi, the bias member will displace and maintain the piston 40 in the first position until the pressure inside the oil reservoir 22 reaches X psi, whereby the actuator system 43 will override the force exerted by the bias member 45 and displace the piston 40 towards the second position.

The oil leakage recovery system 20 may also include a filter 46 located within the housing 41 between the housing inlet 41A and the flow opening 42. The filter 46 can be of any suitable kind to filter impurities, such as oil contaminants, in the flow of the leaked oil towards the piston 40. The filter 46 is located adjacent to the access opening 34 to allow direct access to the filter 46 through the access opening 34 for maintenance or servicing. In an alternative embodiment, the filter 46 can be located directly in the collecting reservoir 30, outside the housing 41. For example, the filter 46 can be mounted at the inlet opening 31 for filtering the leaked oil as it enters the collecting reservoir 30.

In use, oil leaking from the seals, for instance, is collected in the collecting reservoir 30. When the leaked oil inside the collecting reservoir 30 reaches the annular housing inlet 41A, excess leaked oil flows towards the oil system 21 if the oil path is unblocked. When the oil path is blocked, the leaked oil remains inside the collecting reservoir 30. The oil path is locked and unlocked by displacing the piston 40 towards and away from the outlet opening 35 and/or the flow opening 42, respectively.

Accordingly, in a particular embodiment, a method for recovering leaked oil in an oil system of a gas turbine engine is used for receiving and collecting the leaked oil into the collecting reservoir 30, opening an oil passage between the collecting reservoir 30 and the oil system 21 to allow oil collected in the collecting reservoir 30 to leak in the oil system 21 when a threshold pressure value of the oil system 21 is not reached and blocking the oil passage to block and/or impede oil leaking from the collecting reservoir 30 to the oil system 21 when the threshold pressure value is reached. The method can also include activating the actuator system 43 with the pressurized fluid from the oil system 21. In addition, closing the oil passage comprises activating the actuator system 43 with the pressurized fluid as a pressure builds up in the oil system 21 by the gas turbine engine being turned to operative mode.

Referring to FIG. 3, an oil leakage recovery system 120 in accordance with another embodiment of the present disclosure is shown. In this embodiment, the oil leakage recovery system 120 may be removably mounted to the engine 10 as a separate assembly. A collecting reservoir 130 is mounted to a portion of the engine 10 communicating with the leaked oil. The leaked oil enters the oil reservoir 130 through an inlet opening 131. A filter 146 is mounted between an outlet opening 135 and a flow opening 142.

A removable access cover 134A is disposed along a surface of a housing 141 for inspecting and/or providing access to the housing 141 and/or the collecting reservoir 130. The housing 141 is disposed between the collecting reservoir 130 and the oil reservoir 22 to control the flow of the leaked oil therein. The housing 141 has a housing inlet 141A fluidly communicating with the collecting reservoir 130, a housing outlet 141B fluidly communicating with the oil reservoir 22, and a housing channel 141C fluidly communicating with the conduit 23. The housing 141 defines a flow path therein communicating with the housing inlet 141A and the housing outlet 141B to allow the leaked oil to flow from the collecting reservoir 130 to the oil system 21.

Referring to FIGS. 4A and 4B, a piston 240 is shown within a housing 241 in the first position (FIG. 4A) and in the second position (FIG. 4B) in accordance with a particular embodiment of the present disclosure. The housing 241 includes a housing inlet 241A to receive the leaked oil from a collecting reservoir and a housing outlet 241B communicating with the oil reservoir 22. In the first position, the leaked oil is allowed to flow from the collecting reservoir to the oil reservoir 22. In this embodiment, the piston 240 is moved away from a flow opening 242 (FIG. 4A) disposed across a flow path 243 fluidly connecting the housing inlet 241A and the housing outlet 241B via a bias member 245, thereby disengaging the flow opening 242. In this embodiment, the bias member 245 is a spring mounted to a first side of the piston 240 facing the flow opening 242. The other end of the spring is mounted to a shoulder of the housing 241. A second side of the piston 240, opposite to the first side, is exposed to a housing channel 241C fluidly communicating with the conduit 23. The piston 240 is displaced to the second position (FIG. 4B) via the pressurized fluid of the conduit 23 through the housing channel 241C. In the second position, the piston 240 is displaced towards the flow opening 242 abutting a seat 242A around the flow opening 242 to close the flow opening 242 and to block the flow path 243 of the leaked oil.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An oil leakage recovery system for recovering leaked oil in an oil system of a gas turbine engine, the oil leakage recovery system comprising:
   a collecting reservoir extending from an upper portion to a lower portion relative to a horizontal placement of the gas turbine engine relative to the ground in a parked aircraft, the upper portion having an inlet opening and the lower portion being close ended and configured to collect and hold the leaked oil therein by gravity through a first flow path between the inlet opening and the lower portion, the collecting reservoir having an outlet opening disposed between the inlet opening and lower portion, the outlet opening providing access to a second flow path separate from the first flow path, the inlet opening and the outlet opening being configured to communicate with the oil system;
   a piston operatively mounted with the collecting reservoir between the upper portion and the lower portion, the piston movable between a first position in which the piston is disposed away from the outlet opening to allow oil to leak from the collecting reservoir to the oil system through the second flow path and a second position in which the piston blocks the second flow path to impede oil leaking from the collecting reservoir to the oil system; and
   a pressure-controlled actuator system configured to move the piston to the first position when a pressure of the oil system is below a threshold pressure value and to the second position when the pressure of the oil system is above the threshold pressure value.

2. The oil leakage recovery system as defined in claim 1, wherein the pressure-controlled actuator system includes a bias member urging the piston towards the first position.

3. The oil leakage recovery system as defined in claim 1, comprising a filter disposed in the collecting reservoir and configured to block oil contaminants in the oil leaking towards the piston.

4. The oil leakage recovery system as defined in claim 1, comprising an access cover covering an access opening located on a surface of the collecting reservoir and providing direct access to the collecting reservoir.

5. The oil leakage recovery system as defined in claim 1, comprising a housing mounted to the collecting reservoir, the housing for housing the piston and a filter, the filter being configured to block oil contaminants in the oil leaking towards the piston.

6. The oil leakage recovery system as defined in claim 1, wherein the pressure-controlled actuator system is configured to be connected to a conduit which is adapted to be pressurized by the oil system, the pressure-controlled actuator system is activated via a pressure inside the conduit to displace the piston towards the second position when the pressure inside the conduit is above the threshold pressure value.

7. The oil leakage recovery system as defined in claim 1, comprising a drain opening located at a lower part of the collecting reservoir for draining the collecting reservoir.

8. The oil leakage recovery system as defined in claim 1, wherein the piston forms part of a valve connecting the collecting reservoir and the oil system.

9. A gas turbine engine comprising:
at least one internal combustion engine;
an oil system including an oil reservoir fluidly connected to the internal combustion engine for lubricating the internal combustion engine; and
an oil leakage recovery system fluidly connected to the oil system for recovering leaked oil in the oil system, the oil leakage recovery system including:
a collecting reservoir extending from an upper portion to a lower portion relative to a horizontal placement of the gas turbine engine relative to the ground in a parked aircraft, the upper portion having an inlet opening and the lower portion being close ended and configured to collect and hold the leaked oil therein by gravity through a first flow path between the inlet opening and the lower portion, the collecting reservoir having an outlet opening disposed between the inlet opening and lower portion, the outlet opening providing access to a second flow path separate from the first flow path, the inlet opening and the outlet opening communicating with the oil system;
a piston operatively mounted with the collecting reservoir between the upper portion and the lower portion, the piston movable to a first position in which the piston is disposed away from the outlet opening to allow oil to leak from the collecting reservoir to the oil system through the second flow path and a second position in which the piston blocks second flow path to impede oil leaking from the collecting reservoir to the oil system; and
a pressure-controlled actuator system configured to move the piston to the first position when a pressure of the oil system is below a threshold pressure value and to the second position when the pressure of the oil system is above the threshold pressure value.

10. The gas turbine engine as defined in claim 9, wherein the pressure-controlled actuator system includes a bias member urging the piston towards the first position.

11. The gas turbine engine as defined in claim 9, comprising a filter disposed in the collecting reservoir and configured to block oil contaminants in the oil leaking towards the piston.

12. The gas turbine engine as defined in claim 9, comprising an access cover covering an access opening located on a surface of the collecting reservoir and providing direct access to the collecting reservoir.

13. The gas turbine engine as defined in claim 9, comprising a housing mounted to the collecting reservoir, the housing for housing the piston and a filter, the filter being configured to block oil contaminants in the oil leaking towards the piston.

14. The gas turbine engine as defined in claim 9, wherein the pressure-controlled actuator system is connected to a conduit which is adapted to be pressurized by the oil system, the pressure-controlled actuator system is activated via a pressure inside the conduit to displace the piston towards the second position when the pressure inside the conduit is above the threshold pressure value.

15. The gas turbine engine as defined in claim 9, comprising a drain opening located at a lower part of the collecting reservoir for draining the collecting reservoir.

16. The gas turbine engine as defined in claim 9, wherein the piston forms part of a valve connecting the collecting reservoir and the oil system.

* * * * *